US012759400B2

(12) United States Patent
Lottes et al.

(10) Patent No.: US 12,759,400 B2
(45) Date of Patent: Oct. 13, 2026

(54) MOTOR VEHICLE COMPRISING A DISPLAY DEVICE, AND METHOD FOR ADJUSTING A DISPLAY DEVICE

(71) Applicant: AUDI AG, Ingolstadt (DE)

(72) Inventors: Daniel Lottes, Ihrlerstein (DE); Philipp Weiss, Düseldorf (DE)

(73) Assignee: AUDI AG, Ingolstadt (DE)

(*) Notice: Subject to any disclaimer, the term of this patent is extended or adjusted under 35 U.S.C. 154(b) by 341 days.

(21) Appl. No.: 18/289,328

(22) PCT Filed: May 4, 2022

(86) PCT No.: PCT/EP2022/062039
§ 371 (c)(1),
(2) Date: Nov. 2, 2023

(87) PCT Pub. No.: WO2022/233967
PCT Pub. Date: Nov. 10, 2022

(65) Prior Publication Data

US 2024/0367521 A1 Nov. 7, 2024

(30) Foreign Application Priority Data

May 5, 2021 (DE) ..................... 10 2021 111 625.2

(51) Int. Cl.
*B60K 35/22* (2024.01)
*B60K 35/29* (2024.01)
(Continued)

(52) U.S. Cl.
CPC ............ *B60K 35/658* (2024.01); *B60K 35/22* (2024.01); *B60K 35/29* (2024.01); *B60K 35/53* (2024.01);
(Continued)

(58) Field of Classification Search
CPC ...... B60K 35/658; B60K 35/22; B60K 35/29; B60K 35/53; B60K 35/81; B60K 35/10;
(Continued)

(56) References Cited

U.S. PATENT DOCUMENTS 7,852,622 B2 * 12/2010 Ferren .................... B60K 35/10
361/679.04
2017/0322760 A1 * 11/2017 Soh ........................ B60K 35/29

FOREIGN PATENT DOCUMENTS

CN 208630510 U 3/2019
DE 10 2016 011 461 A1 4/2017
(Continued)

OTHER PUBLICATIONS

German Office Action dated Dec. 21, 2021 for German Application No. 10 2021 111 625.2.
(Continued)

*Primary Examiner* — Michael J Brown
(74) *Attorney, Agent, or Firm* — STAAS & HALSEY LLP

(57) ABSTRACT

In a method for adjusting a display device and a motor vehicle having such a display device, the display device is arranged on a dashboard of the motor vehicle. The display device has at least two rimless screens. Each of the screens is connected to the dashboard by an adjustment element. The respective adjustment element can move the respective screens into a plurality of adjustment positions in all spatial directions. In a combined adjustment position, the screens are arranged as a combined display surface, and the screens are designed to display a uniform display image on the combined display surface. In at least one separated adjustment position, a first screen is assigned to a driver's position and a second screen is assigned to a passenger's position.

20 Claims, 2 Drawing Sheets

(51) Int. Cl.

| | |
|---|---|
| ***B60K 35/53*** | (2024.01) |
| ***B60K 35/65*** | (2024.01) |
| ***B60K 35/81*** | (2024.01) |
| *B60K 35/10* | (2024.01) |
| *B60K 35/60* | (2024.01) |

(52) U.S. Cl.
CPC .............. *B60K 35/81* (2024.01); *B60K 35/10* (2024.01); *B60K 35/60* (2024.01); *B60K 35/654* (2024.01); *B60K 35/656* (2024.01); *B60K 2360/1523* (2024.01); *B60K 2360/164* (2024.01); *B60K 2360/182* (2024.01); *B60K 2360/184* (2024.01); *B60K 2360/1868* (2024.01); *B60K 2360/1876* (2024.01)

(58) Field of Classification Search
CPC .... B60K 35/60; B60K 35/654; B60K 35/656; B60K 2360/1523; B60K 2360/164; B60K 2360/182; B60K 2360/184; B60K 2360/1868; B60K 2360/1876; B60K 2360/195; B60K 35/223; B60R 2011/0084; B60R 2011/0085; B60R 11/0235; B60R 2011/0092
USPC ........................................................... 700/28
See application file for complete search history.

(56) References Cited

FOREIGN PATENT DOCUMENTS

| | | | |
|---|---|---|---|
| DE | 10 2016 213 688 | A1 | 2/2018 |
| DE | 10 2018 009 157 | A1 | 5/2020 |
| DE | 10 2019 112 875 | A1 | 11/2020 |
| DE | 10 2019 208 604 | B3 | 11/2020 |
| DE | 10 2019 126 105 | A1 | 4/2021 |
| DE | 10 2019 126 106 | A1 | 4/2021 |
| DE | 10 2021 111 625.2 | | 5/2021 |
| WO | PCT/EP2022/062039 | | 5/2022 |

OTHER PUBLICATIONS

International Search Report dated Aug. 10, 2022 for International Application No. PCT/EP2022/062039.

Written Opinion of the International Searching Authority dated Aug. 10, 2022 for International Application No. PCT/EP2022/062039.

Translation of the International Preliminary Report on Patentability dated Nov. 16, 2023 for International Application No. PCT/EP2022/062039.

Chinese Office Action dated May 7, 2026 for Chinese Application No. 202280032938.4.

* cited by examiner

MOTOR VEHICLE COMPRISING A DISPLAY DEVICE, AND METHOD FOR ADJUSTING A DISPLAY DEVICE

CROSS REFERENCE TO RELATED APPLICATIONS

This application is a U.S. national stage of International Application No. PCT/EP2022/062039, filed on May 4, 2022. The International Application claims the priority benefit of German Application No. 10 2021 111 625.2 filed on May 5, 2021. Both the International Application No. PCT/EP2022/062039 and the German Application No. 10 2021 111 625.2 are incorporated by reference herein in their entirety.

BACKGROUND

Disclosed herein is a motor vehicle having a display device. Also disclosed herein is a method for adjusting a display device.

Motor vehicles having display devices are known from the prior art. In this case, the display device is often part of an infotainment system, and displays providing driving assistance, in particular navigation displays, can be displayed for a driver or entertainment displays, in particular movies, can be displayed for a passenger, for example. In this case, such a display device is usually arranged between the driver and the passenger, whereby an unfavorable viewing angle of the display device can arise and, for example, a driver can be distracted from a traffic situation and a passenger can assume an uncomfortable sitting position when viewing the entertainment display. It is also often not possible to provide displays providing driving assistance and entertainment displays at the same time, since the display device usually has only one screen.

DE 10 2016 011 461 A1 discloses a generic vehicle or aircraft comprising at least one driver or pilot seat and at least one display device, wherein the display device comprises at least one display surface that is directed toward the driver or pilot seat and can be mounted in different positions.

DE 10 2018 009 157 A1 discloses a control arrangement for a motor vehicle, having at least one displaceable display apparatus.

DE 10 2019 112 875 A1 discloses a steering system of a vehicle, wherein the vehicle can be operated in a manual as well as in an autonomous driving mode, wherein the steering system comprises a steering wheel rim and an impact absorber for mounting on a vehicle, and at least one storage device that connects the steering wheel rim to the impact absorber, wherein the impact absorber comprises a display device oriented to the driver of the vehicle.

SUMMARY

An aspect of the present disclosure is to provide a motor vehicle having an improved display device.

A motor vehicle includes a display device which is arranged on a dashboard of the motor vehicle. The display device has at least two screens, and each of the screens is connected to the dashboard by an adjustment element. The respective adjustment element is designed to move the respective screens into a plurality of adjustment positions. In a combined adjustment position, the screens are arranged as a combined display surface, and the screens are designed to display a uniform display image on the combined display surface. In at least one separated adjustment position, a first screen is assigned to a driver's position and a second screen is assigned to a passenger's position. The at least two screens are rimless, and the respective adjustment element is designed to move the respective screens in all spatial directions.

In other words, a display device having at least two screens is provided in a motor vehicle. The screens are rimless, for example. Therefore, the entire visible front surface of the screen is designed to display the display image. In particular, the screens do not have a so-called "primer" which is usually used in screens for making contact, for lighting control and as mechanical protection. In an example, the respective screen may be in the form of a micro-LED screen. Alternatively, the respective screen may be in the form of an LCD, in particular with "Direct Backlight", or in the form of an OLED. Furthermore, provision is made for the respective screens to be in the form of a touch-sensitive screen. In particular, the display device may be designed to display, on its screens, vehicle-relevant information, information relevant to driving safety and infotainment information, in particular entertainment displays. Entertainment displays are used to mean, for example, movies or games.

The screens are connected to the dashboard of the motor vehicle by a respective adjustment element, wherein the adjustment element makes it possible to move the screens in any spatial direction. For this purpose, the adjustment element may be, for example, in the form of a threaded rod and/or a swivel arm. The adjustment element may also be, for example, in the form of a robot arm which can move the screen in all spatial directions. All spatial directions are used to mean at least one direction in the longitudinal axis of the motor vehicle (x-direction), one direction in the width of the motor vehicle (y-direction) and one direction in the height of the motor vehicle (z-direction). In addition, rotational movements around the aforementioned axes may also be provided.

As a result of the ability to move the screens in all spatial directions, it is possible to achieve a plurality of adjustment positions for the screens. For example, the screens can be manually brought into a desired position and/or the adjustment element may comprise motors, in particular electric motors, which can automatically move the screens into adjustment positions. An adjustment position is used to mean an alignment of the screens with predefined coordinates in the space of the motor vehicle, which can be achieved by the respective screen through the adjustment element. At least two adjustment positions can be predefined, wherein, in a combined adjustment position, the two screens are arranged beside one another or above one another such that their narrow sides touch each other. The rimless design of the respective screens thus makes it possible to create a single combined display surface. The combined screens can be controlled in such a way that a display of both screens is matched to each other, thus resulting in a uniform display image. In other words, two individual single images of two screens, for example, can merge into one large image in the combined adjustment position. The screens may have sensor elements on the narrow sides, which are designed to determine that the combined display surface has been achieved.

In a further adjustment position, in particular in a separated adjustment position, a first screen can be assigned to a driver's position and a second screen can be assigned to a passenger's position. This means that the at least two screens can be divided between the driver and the passenger, and so each has their own individual display. The assignment of the screen to the driver's position is used to mean that the screen may be spatially moved to the driver's position so that it is within the driver's range. Likewise, the second screen, which is assigned to the passenger's position, may be moved to the passenger's position so that it is within the passenger's range, for example in a straight line in front of the passenger.

The motor vehicle according to an aspect of the invention is embodied in the form of a motorized vehicle, in particular a passenger car or truck, or as a minibus or motorcycle. In addition, provision may be made for the motor vehicle to be designed for manual driving as well as for autonomous driving.

Aspects of the invention result in the advantage that a particularly flexible display device can be provided in the motor vehicle, whereby an improvement in the display device is obtained. For example, modular screens can be used to provide each vehicle occupant with an individual display, or an enlarged display can be created, in particular by way of the rimless screens, thus allowing, for example, a common entertainment offering to be played.

One embodiment provides for the respective adjustment element to be designed to move the respective screen electromotively into the respective adjustment positions. This means that the adjustment element may have one or more electric motors that can move the screens in the interior of the vehicle. In particular, the screens can be automatically moved to the driver's position and/or the passenger's position and the screens can be automatically moved into the adjacent adjustment position. The advantage of this embodiment is that the screens can be moved automatically. Predetermined adjustment positions can also be stored in the display device. In this way, certain configurations of the screens can be achieved or changed quickly and easily.

In a further embodiment, provision is made for the motor vehicle to be designed to determine a seat occupancy of the passenger's position, wherein the display device is designed to move the screens into the combined adjustment position and to the driver's position when the passenger's position is not occupied. In other words, a sensor can be provided in the motor vehicle, which sensor determines the seat occupancy of the passenger's position. For example, a pressure sensor arranged in the passenger seat can be used for this purpose. When it is determined that the passenger's position is not occupied, the at least two screens can be automatically moved into the combined adjustment position and assigned to the driver's position. This means that the combined display surface is shifted to the driver's position in such a way that the driver has a suitable viewing angle of and/or operating access to the screens which may be in the form of touch-sensitive screens, in particular. The advantage of this embodiment is that a driver, when he is alone in the motor vehicle, is provided with the entire display surface for himself without having to independently adjust the position of the screens. When the passenger's position is occupied, the separated adjustment position or the adjacent adjustment position can be assumed, for example, in which case the combined display surface is not moved to the driver's position, but in a center between the driver's position and the passenger's position, thus allowing a viewing angle and access from both positions.

In a further embodiment, provision is made for the display device to be designed to determine whether the motor vehicle is operated in a manual or an autonomous driving mode and to adjust the screens on the basis of the determined driving mode. Thus, the motor vehicle can be designed to be driven manually by a driver or autonomously or in a piloted manner. For example, when the motor vehicle is operated in the autonomous driving mode, the display device can receive a control signal from the motor vehicle, such that the display device adjusts the screens for the autonomous driving mode. In particular, position and/or safety settings for the screens may depend on the driving mode. The advantage of this embodiment is that, in particular, safety-relevant adjustment options can be activated automatically depending on the driving mode.

Provision is made for the display device to be designed to block at least the first screen in the separated adjustment position for entertainment displays whether the motor vehicle is operated in the manual driving mode. This means that, in the manual driving mode, the driver is not provided with any entertainment displays at least on the first screen when the separated adjustment position has been selected. Provision is made for the driver to not be provided with any entertainment displays on the second screen either when he is alone in the vehicle, which can be determined in particular by the previously described determination of the seat occupancy. Entertainment displays are used to mean, for example, movies and/or games and/or moving displays that can distract the driver from a vehicle environment during the manual driving mode. This can improve safety in the operation of the display device in the motor vehicle.

In a further advantageous embodiment, provision is made for the display device to be designed, in the separated adjustment position, to position the first screen in a longitudinal direction of the vehicle to the driver's position such that a viewing angle of the second screen from the driver's position is substantially obscured by the first screen when an entertainment display is displayed on the second screen and the motor vehicle is operated in the manual driving mode. In this embodiment, provision may be made in particular for a driver and a passenger to be located in the motor vehicle and for the screens to be arranged in the separated adjustment position. For example, the passenger may see an entertainment display on the second screen that could distract the driver from the vehicle environment. In order to avoid this, provision may be made for the adjustment element of the first screen to position the screen to the driver's position in such a way that a viewing angle of the second screen from the driver's position is at least partially obscured by the first screen. This will give the driver no or an impaired view of the second screen with the entertainment display. In order to obscure the viewing angle, provision may be made for the first screen to be moved at least in the longitudinal direction of the vehicle, that is out of the dashboard, to the driver's position in order to obscure the viewing angle. This embodiment makes it possible to improve safety in the operation of the display device.

Provision is made for the display device to be designed to move the screens into the combined adjustment position when the motor vehicle is operated in the autonomous driving mode. In particular, the display device can enable entertainment displays on the at least two screens. The combined adjustment position in the autonomous driving mode enables an entertainment display which can be shared by the driver with a possible passenger, whereby an enlarged display surface can be provided for this purpose. In particular, the combined display surface can be moved centrally between the driver's position and the passenger's position and increased in the z-direction, so that at least the driver and passenger have an improved view of the display device. Alternatively, however, the separated adjustment position can also be set in the autonomous driving mode, so that everyone can retrieve their own display offer.

In a further embodiment, provision is made for at least the second screen to have a visual protection function which is designed to prevent a display image from being displayed from the direction of the driver's position on the second screen when the second screen is assigned to the passenger's position. In other words, this embodiment can prevent the second screen from being able to be viewed from the driver's position when the second screen is located at the passenger's position. For this purpose, a visual protection filter, in particular a lamella film ("shutter film"), can be applied to the second screen as the visual protection function, for example, and can prevent an oblique viewing angle of the display. A shielding angle of the visual protection filter for the driver's position can be predetermined such that shading only occurs when the second screen is assigned to the passenger's position. In other adjustment positions, for example in the middle between the driver's position and the passenger's position, this shading is not visible. This can be achieved, for example, by suitable selection of lamellae of the shutter film. Alternatively or additionally, electrically connectable visual protection filters can also be used, for example by virtue of the second screen generating directed light which exits substantially vertically from the second screen. The advantage of this embodiment is that safety during operation of the display device in the motor vehicle can be further improved.

Preferably, provision is made for the screens to be micro-LED screens. In the case of micro-LED screens, contact is made with the screens on the back of the panels. The LEDs themselves take care of the lighting. A rim is therefore not necessary for these screens. This has the advantage of being able to display modular screens that do not have a visible transition.

An aspect of the invention also provides a method for adjusting a display device, with a motor vehicle according to one of the preceding embodiments, wherein a seat occupancy of the passenger's position is determined, wherein it is determined whether the motor vehicle is operated in a manual or an autonomous driving mode, and wherein a respective screen of the display device is moved electromotively into predefined adjustment positions by a respective adjustment element on the basis of the determined seat occupancy and on the basis of the determined driving mode. This results in the same advantages and possible variations as for the motor vehicle.

An aspect of the invention also includes the control device for the motor vehicle. The control device may comprise a data processing device or a processor apparatus configured to carry out an embodiment of the method according to an aspect of the invention. For this purpose, the processor apparatus may comprise at least one microprocessor and/or at least one microcontroller and/or at least one FPGA (field programmable gate array) and/or at least one DSP (digital signal processor). Furthermore, the processor apparatus may comprise program code configured to carry out the embodiment of the method according to an aspect of the invention upon execution by the processor apparatus. The program code may be stored in a data memory of the processor apparatus.

An aspect of the invention also includes developments of the method according to aspects of the invention, which have features as have already been described in connection with the developments of the motor vehicle according to aspects of the invention. For this reason, the corresponding developments of the method according to aspects of the invention will not be described again here.

Aspects of the invention also include the combinations of the features of the described embodiments. Aspects of the invention thus also include implementations, each having a combination of the features of a plurality of the embodiments described, provided that the embodiments were not described as mutually exclusive.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

Figure 1:
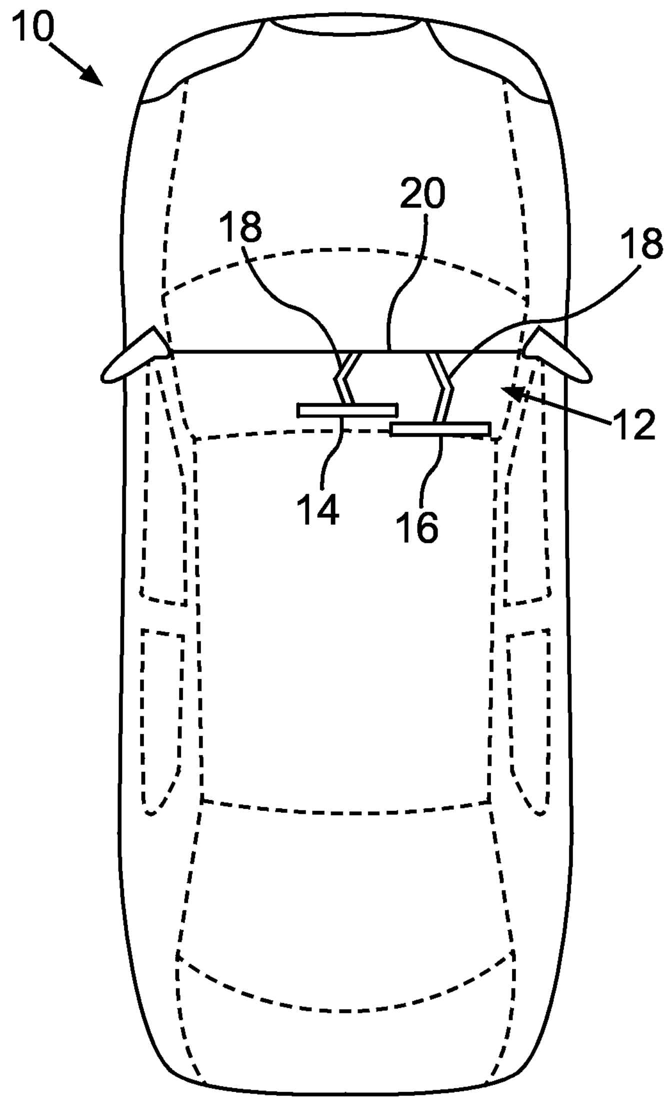
FIG. 1 shows a schematic plan view of a motor vehicle having a display device according to an exemplary embodiment.

Reference will now be made in detail to the preferred embodiments, examples of which are illustrated in the accompanying drawings, wherein like reference numerals refer to like elements throughout.

The exemplary embodiments discussed below are preferred embodiments of the invention. In the exemplary embodiments, the described components of the embodiments each represent individual features of the invention that should be considered independently of one another and also develop the invention in each case independently of one another. The disclosure is therefore also intended to comprise combinations of the features of the embodiments other than those illustrated. Furthermore, the described embodiments may also be supplemented by further features of the invention that have already been described.

In the figures, identical reference signs each denote elements of identical function.

FIG. 1 shows a schematic plan view of a motor vehicle 10 having a display device 12 according to an exemplary embodiment. The display device 12 may comprise at least a first screen 14 and a second screen 16. The screens 14, 16 are rimless, for example, such that an entire surface forms a display surface of the screens 14, 16. For this purpose, micro-LED screens can be used, in which lighting for a display comes from the LEDs themselves, and in which no separate lighting control, which is usually located in the edge of the screens, is required. In addition, the two screens 14, 16 may be in the form of touch-sensitive screens which enable control via touch inputs.

The two screens 14, 16 are connected to a dashboard 20 or an instrument panel of the motor vehicle 10 via a respective adjustment element 18, wherein the respective adjustment element 18 is designed to move the respective screens 14, 16. The screens 14, 16 can thus be moved in all spatial directions within the motor vehicle 10, which means that the screens 14, 16 can each be moved independently of each other in a longitudinal direction of the motor vehicle 10, in a lateral direction of the motor vehicle 10 and in a height direction of the motor vehicle 10. A rotational movement around these axes can also be performed. The adjustment elements 18 can comprise swivel arms and/or threaded rods, in which case these can be driven electromotively. This means that the adjustment elements 18 can be in the form of robot arms, for example. A movement in the width of the vehicle can be carried out additionally or alternatively by a displacement along the dashboard 20.

In particular, the adjustment elements 18 can be used to move the screens 14, 16 into predefined adjustment positions which are explained by way of example below with reference to FIGS. 2 and 3.

Figure 2:
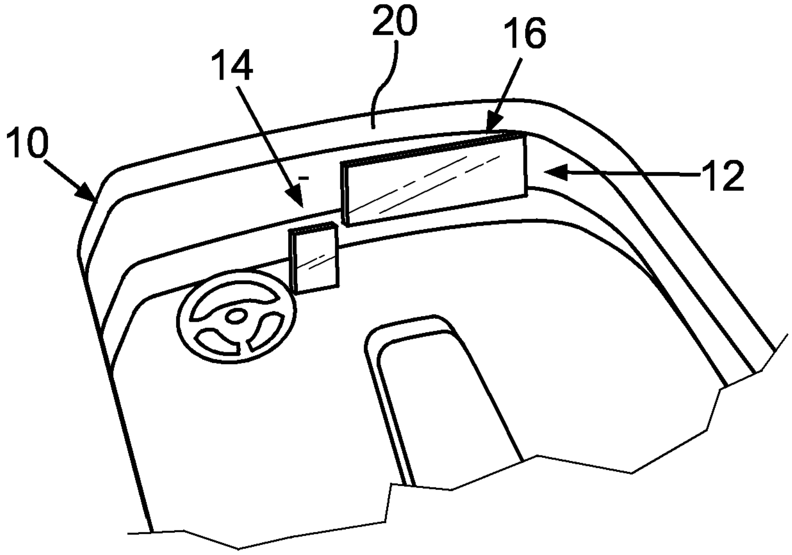
FIG. 2 shows a perspective view of a display device of the motor vehicle according to an exemplary embodiment.

FIG. 2 shows a perspective view of a display device of the motor vehicle 10 according to an exemplary embodiment. In this figure, the screens 14, 16 are arranged in a separated adjustment position. In the separated adjustment position, the first screen 14 may be assigned to a driver's position, which means that the first screen is arranged within the sight and reach of a driver of the motor vehicle 10. The second screen 16 may be assigned to a passenger's position in this adjustment position and may be directly in front of a passenger. The first screen 14 and the second screen 16 can be controlled with different display images and contents, with the result that each vehicle occupant receives their individual display image.

The motor vehicle 10 may be designed to be operated in a manual and/or autonomous driving mode, wherein the display device 12 can determine which driving mode is carried out. Depending on the determined driving mode, the display device 12 can then make adjustments for the screens 14, 16. For example, the display device 12 may block at least the first screen 14 during the manual driving mode for entertainment displays. Thus, a driver can use the first screen 14 for driving tasks, such as navigation. The second screen 16 may still be enabled for entertainment displays for the passenger.

To prevent the driver from being distracted by the entertainment display displayed on the second screen 16, provision may be additionally made for a visual protection function to be provided for the second screen 16. The visual protection function can be achieved in particular by a visual protection filter or a shutter film which is glued to the second screen 16. A shutter film prevents light radiation at a predefined angle, wherein this angle may be selected such that a viewing angle of the second screen 16 from the driver's position is prevented when the second screen 16 is in front of the passenger's position. If the second screen 16 is moved closer to the driver's position, the angle can change in such a way that a display image is again visible to the driver.

Alternatively or additionally, the display device 12 can move the first screen 14 in the longitudinal direction of the vehicle to the driver's position such that a viewing angle of the second screen 16 from the driver's position is substantially obscured by the first screen 14 when the driver is controlling the motor vehicle 10 and the passenger is watching a movie on the second screen, for example.

Figure 3:
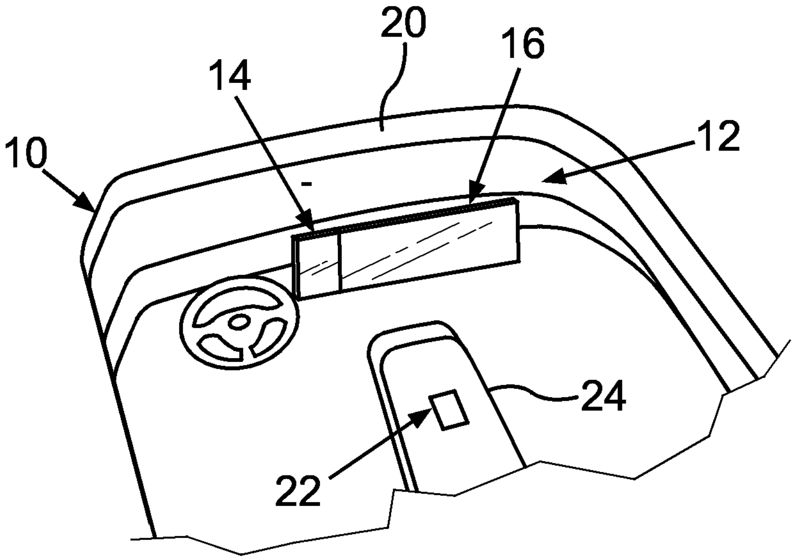
FIG. 3 shows a further perspective view of the display device of the motor vehicle according to an exemplary embodiment.

FIG. 3 shows a further perspective view of the display device 12 of the motor vehicle 10. In this representation, the screens 14, 16 can be moved into a combined adjustment position, whereby a combined display surface with a uniform display image can form on the combined display surface. Since the screens 14, 16 are rimless, a barely perceptible transition between the first screen 14 and the second screen 16 can be achieved.

This adjustment can be selected, for example, when it is determined that the motor vehicle 10 is in an autonomous driving mode and, for example, a driver and a passenger in the motor vehicle request an entertainment display during the journey. In particular, for this purpose, the combined display of the screens 14, 16 can be moved into a central position between the driver's position and the passenger's position, and increased in the vehicle height direction. This results in a large display surface that can be easily viewed from both positions. Since the screens 14, 16 may be further away from the driver and passenger, provision may be made for an operating element 22 of the display device 12 to be additionally arranged in a center console 24 of the motor vehicle.

However, the combined adjustment position can also be generated automatically when a driver is sitting alone in the motor vehicle. This can be done by checking a seat occupancy of the passenger's position and, when it is determined that the passenger's position is not occupied, the screens 14, 16 can move into the combined adjustment position and the combined display surface thus created can move in the direction of the driver's position, with the result that the driver has improved access to the screens 14, 16.

Thus, an aspect of the invention makes it possible for a representation by display surfaces to be optimally matched to a particular case. In particular, the display device can make a respective adjustment which provides optimal operation for a driver and at the same time an optimal display position for the passenger. Furthermore, freedom from visual distraction for the driver during a manual drive can be achieved, an optimal display surface for individually or jointly used display surfaces during an autonomous drive can be achieved, and ergonomic positioning of the displays (screens 14, 16) in different seating positions can be achieved.

In a further exemplary aspect, provision is made for two displays (first screen 14 and second screen 16) to be mounted on the instrument panel (dashboard 20) of the vehicle 10. Both displays 14, 16 have an electromechanical system which can be provided by the adjustment elements 18. The first display 14 is assigned to the driver. It can be moved forward in the direction of the vehicle (x) and up (z). The second display 16 is more likely to be assigned to the passenger. It can be moved back in the direction of the vehicle (x) and toward the driver's side (y).

A shutter film can also be applied to the second display 16. This allows the driver to not perceive any visual content on the passenger's display (second display 16) during manual driving. Since the film can be designed for this special angle, in particular can be designed to darken, the second display 16 would still work in all other positions for the driver.

Overall, the examples show how the invention can provide combined displays via an integrated mechanism, which displays can be converted into a wide variety of positions.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A motor vehicle comprising:

a display device on a dashboard of the motor vehicle, the display device comprising at least two screens, each of the at least two screens being rimless and connected to the dashboard by a respective adjustment element, each respective adjustment element comprising a robot arm to move a respective screen of the at least two screens into a plurality of adjustment positions and in all a plurality of spatial directions, wherein, in a combined adjustment position, the at least two screens are arranged as a combined display surface and the at least two screens to display a uniform display image on the combined display surface, and in at least one separated adjustment position, a first screen of the at least two screens is assigned to a driver's position and a second screen of the at least two screens is assigned to a passenger's position.

2. The motor vehicle as claimed in claim 1, wherein the respective adjustment element to move the respective screen of the at least two screens electromotively into the respective adjustment positions.

3. The motor vehicle as claimed in claim 2, wherein the motor vehicle to determine a seat occupancy of the passenger's position, wherein the display device to move the at least two screens into the combined adjustment position and to the driver's position when the passenger's position is not occupied.

4. The motor vehicle as claimed in claim 3, wherein the display device to determine whether the motor vehicle is operated in a manual or an autonomous driving mode and to adjust the at least two screens on the basis of the determined driving mode.

5. The motor vehicle as claimed in claim 4, wherein the display device to block at least the first screen in the separated adjustment position for entertainment displays when the motor vehicle is operated in the manual driving mode.

6. The motor vehicle as claimed in claim 5, wherein the display device, in the separated adjustment position, to position the first screen in a longitudinal direction of the vehicle to the driver's position such that a viewing angle of the second screen from the driver's position is substantially obscured by the first screen when an entertainment display is displayed on the second screen and the motor vehicle is operated in the manual driving mode.

7. The motor vehicle as claimed in claim 4, wherein the display device, in the separated adjustment position, to position the first screen in a longitudinal direction of the vehicle to the driver's position such that a viewing angle of the second screen from the driver's position is substantially obscured by the first screen when an entertainment display is displayed on the second screen and the motor vehicle is operated in the manual driving mode.

8. The motor vehicle as claimed in claim 4, wherein the display device to move the at least two screens into the combined adjustment position when the motor vehicle is operated in the autonomous driving mode.

9. The motor vehicle as claimed in claim 2, wherein the display device to determine whether the motor vehicle is operated in a manual or an autonomous driving mode and to adjust the at least two screens on the basis of the determined driving mode.

10. The motor vehicle as claimed in claim 9, wherein the display device to block at least the first screen in the separated adjustment position for entertainment displays when the motor vehicle is operated in the manual driving mode.

11. The motor vehicle as claimed in claim 10, wherein the display device, in the separated adjustment position, to position the first screen in a longitudinal direction of the vehicle to the driver's position such that a viewing angle of the second screen from the driver's position is substantially obscured by the first screen when an entertainment display is displayed on the second screen and the motor vehicle is operated in the manual driving mode.

12. The motor vehicle as claimed in claim 10, wherein the display device to move the at least two screens into the combined adjustment position when the motor vehicle is operated in the autonomous driving mode.

13. The motor vehicle as claimed in claim 9, wherein the display device, in the separated adjustment position, to position the first screen in a longitudinal direction of the vehicle to the driver's position such that a viewing angle of the second screen from the driver's position is substantially obscured by the first screen when an entertainment display is displayed on the second screen and the motor vehicle is operated in the manual driving mode.

14. The motor vehicle as claimed in claim 13, wherein the display device to move the at least two screens into the combined adjustment position when the motor vehicle is operated in the autonomous driving mode.

15. The motor vehicle as claimed in claim 9, wherein the display device to move the at least two screens into the combined adjustment position when the motor vehicle is operated in the autonomous driving mode.

16. The motor vehicle as claimed in claim 2, wherein at least the second screen has a visual protection function to prevent a display image from being displayed from the direction of the driver's position on the second screen when the second screen is assigned to the passenger's position.

17. The motor vehicle as claimed in claim 2, wherein the at least two screens are micro-LED screens.

18. The motor vehicle as claimed in claim 1, wherein at least the second screen has a visual protection function to prevent a display image from being displayed from the direction of the driver's position on the second screen when the second screen is assigned to the passenger's position.

19. The motor vehicle as claimed in claim 1, wherein the at least two screens are micro-LED screens.

20. A method for adjusting a display device, with a motor vehicle as claimed in claim 1, the method comprising:

determining a seat occupancy of the passenger's position;

determining whether the motor vehicle is operated in a manual or an autonomous driving mode; and moving a respective screen of the at least two screens of the display device electromotively into predefined adjustment positions by a respective adjustment element on the basis of the determined seat occupancy and on the basis of the determined driving mode.

* * * * *